(12) United States Patent
Schmidt

(10) Patent No.: US 8,235,005 B2
(45) Date of Patent: Aug. 7, 2012

(54) SMALL ANIMAL TREAT DISPENSER

(75) Inventor: Allyson Schmidt, Hoffman Estates, IL (US)

(73) Assignee: Kaytee Products Incorporated, Chilton, WI (US)

( * ) Notice: Subject to any disclaimer, the term of this patent is extended or adjusted under 35 U.S.C. 154(b) by 0 days.

(21) Appl. No.: 12/844,659

(22) Filed: Jul. 27, 2010

(65) Prior Publication Data

US 2012/0024883 A1  Feb. 2, 2012

(51) Int. Cl.
*A01K 29/00* (2006.01)

(52) U.S. Cl. .................. 119/51.01; 119/702

(58) Field of Classification Search .......... 119/51.01, 119/51.04, 454, 456, 475, 702, 707, 708
See application file for complete search history.

(56) References Cited

U.S. PATENT DOCUMENTS

| | | | | |
|---|---|---|---|---|
| 4,046,108 A | * | 9/1977 | Balgemann et al. | 119/469 |
| 4,688,520 A | * | 8/1987 | Parks | 119/51.11 |
| 5,150,666 A | * | 9/1992 | Momont et al. | 119/57.91 |
| 6,085,691 A | * | 7/2000 | Loehndorf | 119/51.01 |
| 6,142,100 A | * | 11/2000 | Marchioro | 119/54 |
| 6,408,787 B1 | * | 6/2002 | Clark | 119/51.01 |
| 6,748,901 B1 | * | 6/2004 | Kleinsasser | 119/475 |
| 6,941,895 B2 | * | 9/2005 | St. Pierre | 119/711 |
| 6,953,007 B1 | * | 10/2005 | Cummings | 119/712 |
| 6,959,664 B1 | * | 11/2005 | Keuter et al. | 119/54 |
| 6,988,464 B1 | * | 1/2006 | Rutledge | 119/51.01 |
| 7,004,111 B2 | * | 2/2006 | Olson | 119/712 |
| 7,028,640 B1 | * | 4/2006 | Cummings | 119/712 |
| 7,520,247 B2 | * | 4/2009 | Rutledge | 119/51.01 |
| 2005/0263082 A1 | * | 12/2005 | Rutledge | 119/51.01 |
| 2005/0263098 A1 | * | 12/2005 | Olson | 119/712 |
| 2006/0065199 A1 | * | 3/2006 | Davis | 119/51.01 |
| 2007/0074668 A1 | * | 4/2007 | Zutis et al. | 119/51.01 |
| 2008/0029033 A1 | * | 2/2008 | Harrison et al. | 119/51.04 |
| 2008/0087223 A1 | * | 4/2008 | Morris | 119/51.01 |
| 2009/0314223 A1 | * | 12/2009 | Yuu et al. | 119/720 |
| 2010/0095896 A1 | * | 4/2010 | Van Wye | 119/57.92 |
| 2010/0242846 A1 | * | 9/2010 | Kolkovski et al. | 119/51.04 |

* cited by examiner

*Primary Examiner* — Yvonne Abbott

(74) *Attorney, Agent, or Firm* — Nicholas A. Kees; Godfrey & Kahn, S.C.

(57) ABSTRACT

A treat dispenser for a pet animal enclosure, the treat dispenser allowing a user to selectively release a treat into the enclosure without having to open the enclosure. The treat dispenser may include a top with an opening into which a user may place a treat for the pet animal. The treat dispenser may include a user actuated mechanism to release a treat into a tube extending from the top to a bottom, the bottom including an opening to deliver the treat to the pet animal within the enclosure.

9 Claims, 1 Drawing Sheet

SMALL ANIMAL TREAT DISPENSER

BACKGROUND

Small animals are often kept as pets to provide amusement, entertainment and companionship for the pet owners. Often these small animals, such as but not limited to mice, gerbils, guinea pigs, rabbits, rats, etc., are kept in clear or see-thru cages or enclosures. It is desirable to provide a way to deliver treats to such animals within such enclosures without having to open the enclosure itself. This can prevent accidental escape of the pets and can keep unwanted touching of the pets by providing access control to the enclosure.

An improved device for delivering treats to such pets and possibly signaling the delivery of such treats is desirable.

DESCRIPTION

Figure 1:
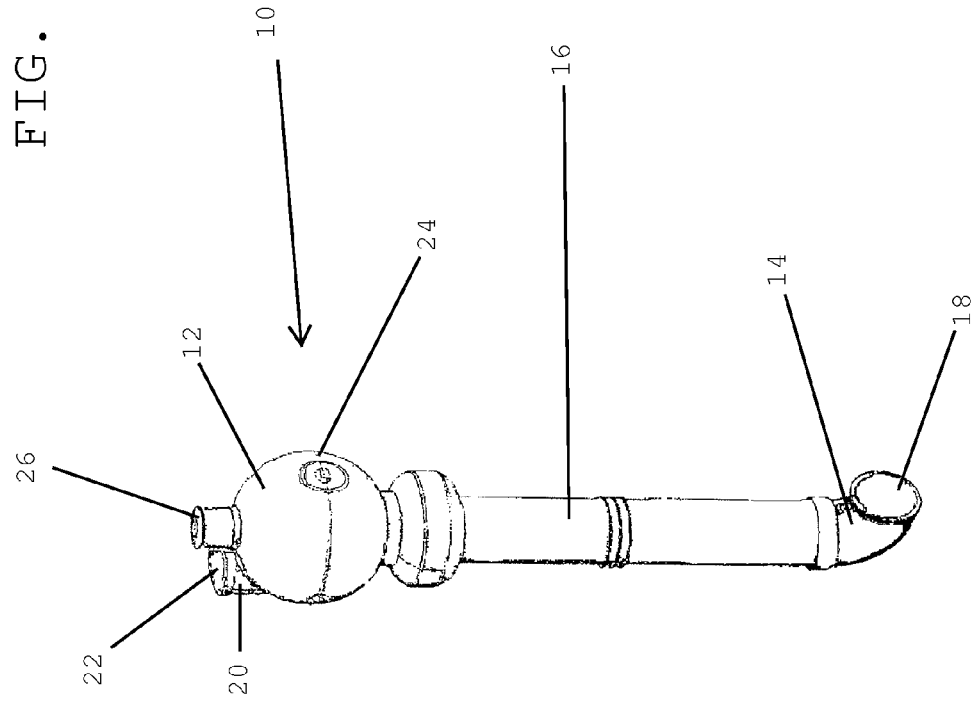
FIG. 1 is a perspective view of a treat dispenser according to the present disclosure.

FIG. 1 illustrates a dispenser 10 with a top 12 and a bottom 14 with a body tube 16 extending therebetween. Dispenser 10 is configured for mounting the side of a pet enclosure with top 12 extending outside of the enclosure and at least a portion of the bottom extending into the enclosure. Particularly, a treat delivery opening 18 at the bottom of dispenser 10 extends into or is accessible by an animal within the enclosure.

Top 12 includes a treat deposit opening 20 with a removable cover 22 permitting a pet owner to drop a treat for the pet into the dispenser. The treat will then travel down the length of body tube 16 and be delivered to the animal within the enclosure at opening 18. Top 12 may also be configured with a reservoir 24 permitting multiple treats to be held within dispenser 10. A top mounted actuator 26 may be provided to permit the pet owner to selectively permit one or more treats from within the reservoir to enter body tube 16 for delivery to the animal.

Figure 2:
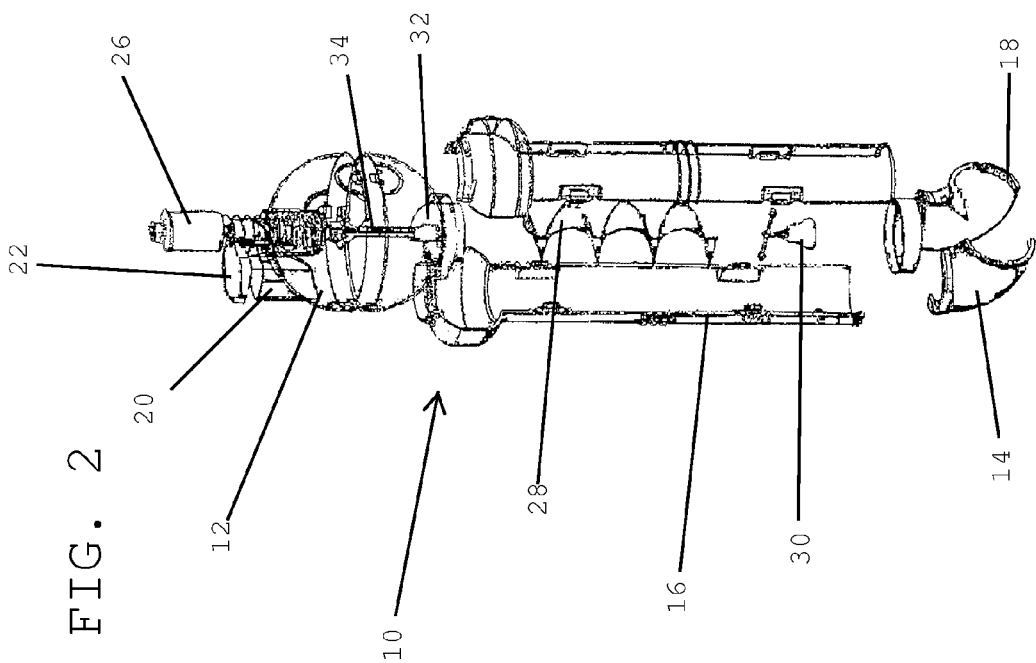
FIG. 2 is an exploded perspective view of the treat dispenser of FIG. 1.

Referring now to FIG. 2, dispenser 10 may include a spiral treat slide or other structure within body tube 16 to slow the travel of a treat to opening 18 and also to possibly generate noise or vibrations to alert the animal of the treat's delivery. While a helix or spiral is shown, other designs or configurations of structures within tube 16 are anticipated, including but not limited to offset plates, staggered pins or walls, etc. To further enhance the treat dispensing alert to the animal and to provide amusement to the owner, a bell or other signal device 30 may be provided within tube 16. The signal device 30 is preferably positioned so that the treat will impact the device as it exits the structure 28 on its way to opening 18.

Actuator 26 may be connected to a reservoir stop 32 at a base of reservoir 24 between the reservoir and body tube 16. Such connection may be by means of a shaft 34 or some other mechanical connection. Stop 32 may be actuating by lifting or rotating actuator 26 to permit only one or a controlled number of treats to be released into body tube 16 for delivery to opening 18.

As shown, dispenser 10 may be made of a plurality of plastic or parts of some other similar material. These parts may be snap-fit together to permit easy assembly and disassembly by owners for cleaning and maintenance of the dispenser, such as removal of treats which have become lodged within the dispenser. Such snap-fit construction may permit an owner or user to customize the structure or signal device with tube 16 or to adapt stop 32 for the particular type or size of treat, or number of treats to be delivered by use of actuator 26. Alternatively, the various parts of dispenser 10 may be more durably attached to each other, such as but limited to welding, ultrasonic welding, glues, non-removable snap-fit assembly, etc.

Opening 18 may be configured to have replaceable or removable elements to permit the opening to be adapted to a particular size or type of treat to be delivered, or animal for which the treat is intended. Options for such alternative elements of bottom 14 may include but not be limited to a lip or lower extension designed to retain the treat within opening 18 and holding the treat for the animal to access.

The foregoing description is intended to be merely illustrative of the concept embodied in the present disclosure and is not intended to limit the scope of the disclosure. It is anticipated that additional embodiments may be developed within the scope of the present disclosure.

What is claimed is:

1. A treat dispenser for delivering an edible treat to a pet animal within an enclosure, the dispenser comprising:
   a top with an opening for receiving a treat for delivery to the pet animal within the enclosure, the top extending outside the enclosure and accessible to a person outside the enclosure;
   a bottom with an opening for delivering the treat to the pet animal within the enclosure, the opening of the bottom extending into the enclosure;
   a body tube extending between the top and the bottom and providing a path for a treat to pass from the opening of top to the opening of the bottom;
   means for mounting the dispenser to a side of the enclosure;
   the top further including an actuator actuatable from outside the enclosure to selectively dispense the treat from the top into the body tube for delivery to the pet animal within the enclosure;
   a reservoir at the top for receiving a plurality of treats and having a base, the treats retained within the reservoir by the actuator; and
   a reservoir stop at the base of the reservoir, the stop connected to a plunger extending outside of the reservoir, the plunger configured to release the treat into the tube when actuated from outside the enclosure.

2. The treat dispenser of claim 1, further comprising at least one structure within the tube that engages the treat as the treat passes from the top toward the bottom.

3. The treat dispenser of claim 2, wherein the at least one structure within the tube is a slide.

4. The treat dispenser of claim 2, wherein the at least one structure within the tube is a spiral slide.

5. The treat dispenser of claim 2, wherein the at least one structure within the tube is a structure configured to provide an audible warning to the pet of the dispensing of the treat from the top toward the bottom.

6. The treat dispenser of claim 5, wherein the at least one structure configured to provide an audible warning is a bell positioned to be struck by the falling treat within the tube.

7. The treat dispenser of claim 2, wherein the at least one structure within the tube removable and replaceable with a different structure.

8. The treat dispenser of claim 1, further comprising a removable cover fitted over the treat receiving opening.

9. The treat dispenser of claim 1, further comprising a lip at the opening of the bottom configured to retain the treat within the opening until accessed by the pet animal.

* * * * *